John S. Truxell.
Harvester.

No. 120,911.  Patented Nov. 14, 1871.

Witnesses:

Inventor:
John S. Truxell
per
Attorneys.

UNITED STATES PATENT OFFICE.

JOHN S. TRUXELL, OF GREENSBURGH, PENNSYLVANIA.

IMPROVEMENT IN HARVESTERS.

Specification forming part of Letters Patent No. 120,911, dated November 14, 1871; antedated October 28, 1871.

*To all whom it may concern:*

Be it known that I, JOHN S. TRUXELL, of Greensburgh, in the county of Westmoreland and State of Pennsylvania, have invented a new and Improved Harvester; and I do hereby declare the following to be a full, clear, and exact description of the same, reference being had to the accompanying drawing making a part of this specification, in which—

Figure 1:
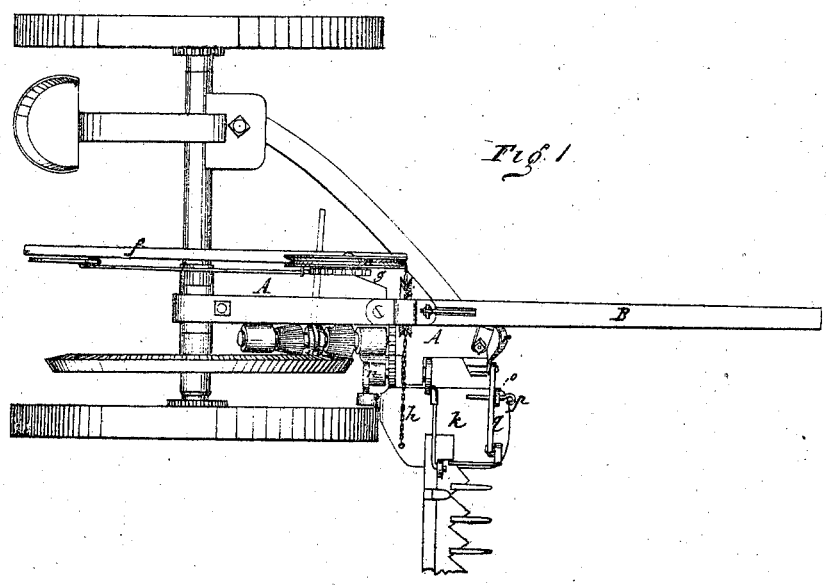
Figure 2:
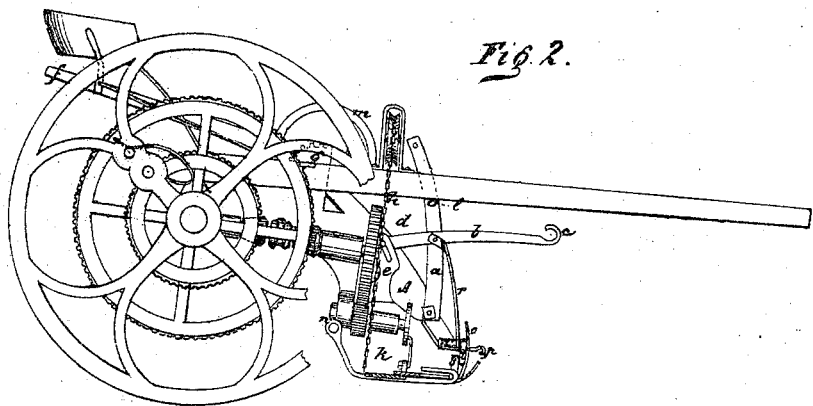

Figure 1 is a plan view, and Fig. 2 is a side elevation.

This invention has for its object improvement in the class of harvesters the pitch of whose sickle-bar is adjustable; and it consists in the combination of devices whereby the draft-bar or attachment and the sickle-bar may be relatively adjusted so as to counteract the resistance of the crop and prevent the downward or upward pitch of the cutter from affecting the ordinary or perfect operation of the machine.

Referring to the drawing, $a$ is an arm springing from the lower part and front side of the frame A, said arm passing through a slot in the tongue B. $b$ is a bar pivoted near its middle to the arm $a$, and having at its front end a hook, $c$, for the attachment of the draft-animals, and having at one side, near its rear end, a clamp-bolt that enters an inclined slot, $d$, made in a standard, $e$, that springs from the frame A in rear of the arm $a$. By means of the clamp-bolt and slot $d$ the front end of the bar $b$ may be raised or lowered. The higher the hook $c$ is raised the more downward is the application of the draft, and the lower the hook is placed the more upward is the application of the draft. Hence the hook is placed lower in cutting heavy crops than in cutting light ones, in order that the greater resistance of the heavier crop may be counteracted by the more upward tendency of the draft, and the heavier crop be prevented in this manner from exerting an excessive strain upon the frame. The frame A, including both the lower front part, from which the arm $a$ and standard $e$ arise, and the rear higher part, which is attached to the axle, is made all in one piece. The hoisting-lever $f$ is pivoted to the outer side of a standard, $g$, that springs from the upper part of the frame A. One end of the lifting-chain $h$ is attached to the front end of the lever $f$, which chain, passing over a grooved wheel, $i$, runs thence down to the shoe $k$ of the finger-bar. By raising the rear end of the lever $f$ the shoe $k$ is first elevated until a pin, $l$, of the arm $a$ strikes the under side of the tongue, and then the finger-bar begins to be tilted upward. A grooved curved guide, $m$, is secured to the end of the lever $f$, and this guide takes up the chain as fast as it runs over the wheel $i$. The guide is of eccentric shape with reference to the pivot of the lever $f$, the distance from said pivot to the front end of the guide being the least, and the other points in the curve gradually increasing in distance from the pivot from that point. The effect of this construction is to practically lengthen the shorter arm of the lever $f$ as said shorter arm descends, thus causing the lever to act most powerfully at the start, where the resistance is greatest, and to act more rapidly as the resistance lessens. The standard $e$, in conjunction with the bar $b$, strengthens the inner pivot $n$ of the shoe $k$, enabling that pivot to resist the stress of shocks received by the finger-bar. A brace, $q$, jointed at its upper end to the pivot $n'$, extends thence downward to the shoe $k$, and from one side of said brace, near its lower end, a pin projects into a lug, $s$, that springs from the shoe. A curved standard, $o$, rises from the shoe by the side of the brace $q$, which standard has a number of holes made through it, one above another. A pin, P, passing through both, connects this standard and the brace $q$, and the pitch of the cutter-bar may be changed by shifting the pin $p$ from one hole of the standard $o$ to another. The pin $p$ is split so as to make it elastic, in order to retain it in the holes. It will be perceived that the pitch of the sickle-bar and of the draft-bar $b$ may be relatively adjusted—that is to say, the one may be set at an upward or downward inclination, according as the condition of the crop or nature of the field surface on which the machine may be operating may require the adjustment of the other. For instance, should the crop be "lodged" or inclined mainly in one direction, the sickle-bar should be set as nearly as possible at such an angle to the ground as to be perpendicular to the grain. The draft-bar must then be set at a downward inclination, so as to cause the draft strain or tension to tend to lift the sickle-bar and prevent its bearing or being borne too heavily downward. Other adjustments may be made; but these will readily occur to the agriculturist with slight experience in use of the machine.

Having thus described my invention, what I claim as new, and desire to secure by Letters Patent, is—

The combination of the pivoted draft-bar b, adjustable at its rear end in the slotted standard e, the standard o, pin p, brace q, hinged shoe k, and the sickle-bar, substantially as herein shown and described, for the purpose specified.

J. S. TRUXELL.

Witnesses:
THOS. D. D. OURAND,
CHAS. A. PETTIT. (74)